Sept. 3, 1968     F. L. WENINGER     3,399,844
TAKE-UP REEL HAVING TORQUED SPROCKET RING
Filed Nov. 10, 1966
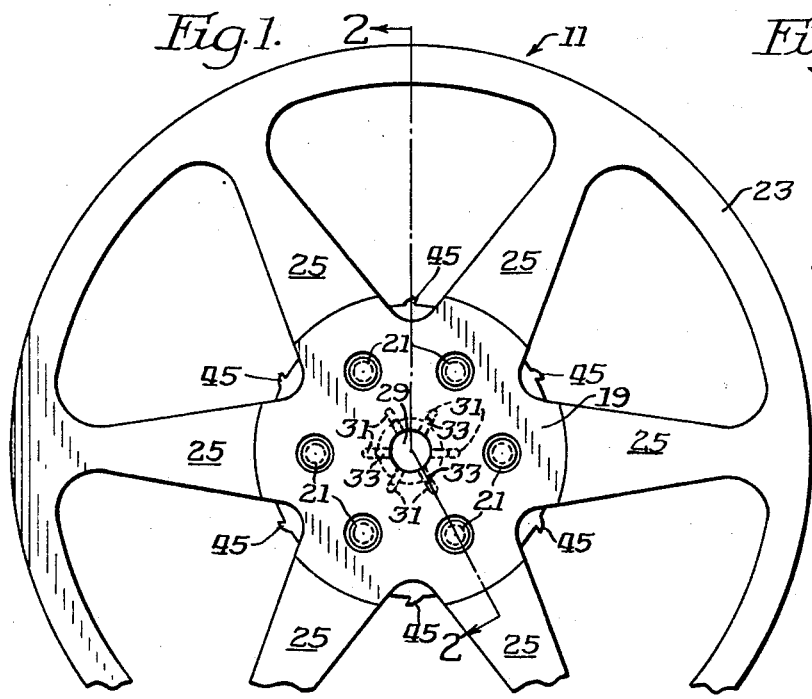
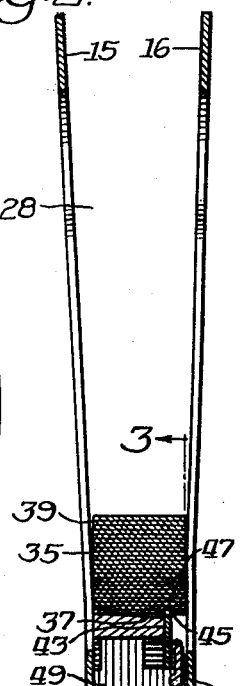
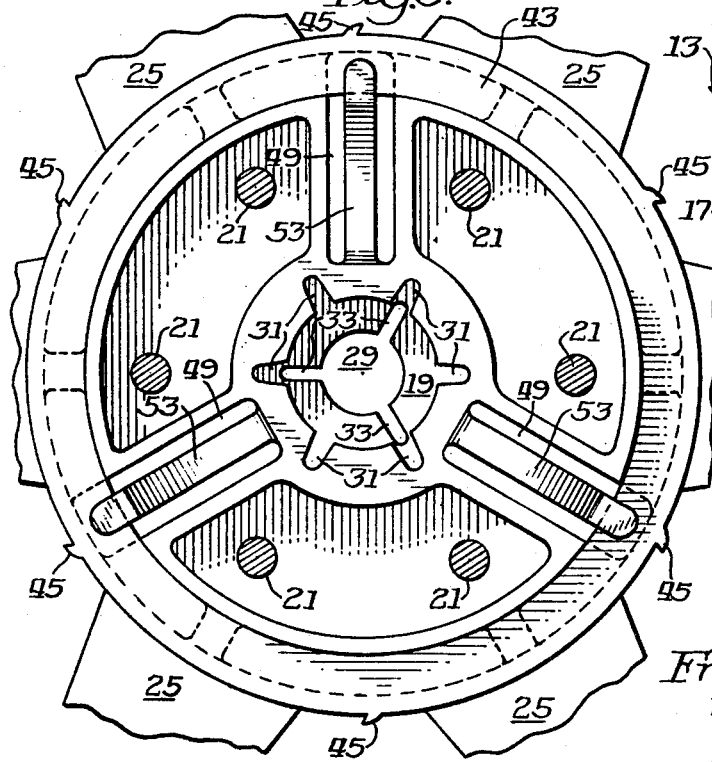
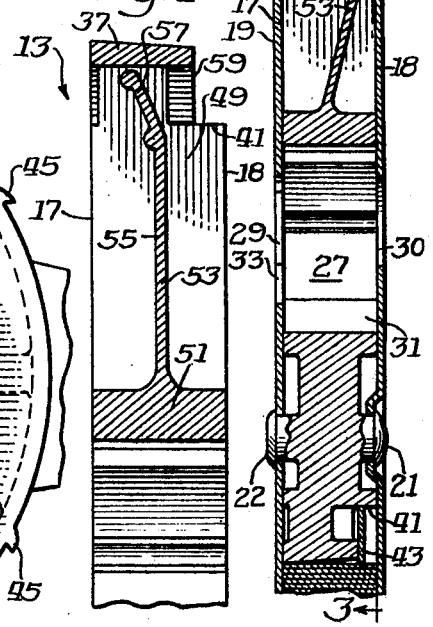
INVENTOR.
Frank L. Weninger
BY
John E. Peele Jr. Attys United States Patent Office 3,399,844
Patented Sept. 3, 1968

3,399,844
TAKE-UP REEL HAVING TORQUED
SPROCKET RING
Frank L. Weninger, Chicago, Ill., assignor to Bell &
Howell Company, Chicago, Ill., a corporation of
Illinois
Filed Nov. 10, 1966, Ser. No. 593,395
5 Claims. (Cl. 242—74)

ABSTRACT OF THE DISCLOSURE

Disclosed is a rotatable web handling take-up reel having flanges extending from the reel hub to form a web chamber. A sprocket ring having web engaging teeth surrounds the hub and is held in slippable frictional engagement and for rotation relative the hub by elongated holding means formed integral with the hub at one end, and yieldably engaging the sprocket ring at the other end with sufficient torque to cause slippable co-rotation of the ring with the hub.

---

The present invention relates to reels for handling elongated webs.

Particularly the invention relates to a take-up reel assembly for webs of the type exemplified by motion picture film and record tape.

Conventionally, a take-up reel assembly of the class indicated comprises a hub adapted to be rotationally driven to coil thereabout a web drawn or fed from a supply source. A pair of axially spaced flanges which extend radially from the periphery of the hub define a web chamber in which a coil is accumulated during web take-up. To the end that an initial convolution of a web is gripped for formation of a coil about a hub, a sprocket ring is conventionally provided.

A conventional sprocket ring has circumferential teeth which extend radially slightly beyond the outer surface of its hub. The sprocket ring is arranged for securance to the hub for co-rotation therewith. The teeth of the sprocket ring are adapted to engage in notches of a first convolution of a web, thereby to form a coil about a driven hub.

An enlarging web coil builds torque which is impressed on its hub in an opposite angular direction to the drive torque of such hub. If the magnitude of the coil-impressed torque exceeds the magnitude of the drive torque, the hub will stall and produce attendant undesired effects. Therefore, conventionally, a sprocket ring is held in releasable association with its hub for slippable co-rotation therewith. Thereby, excessive web-generated torque may be relieved. For that purpose a metal wave washer with an annular undulation is arranged adjacent the sprocket ring for impingement of the latter against the hub, with a fixed torque permitting sprocket ring slippage under torque conditions determined by the characteristics of the wave washer.

It is an object of the present invention to provide an improved construction to minimize the cost of a take-up reel assembly adapted for webs exemplified by motion picture film.

Another object of the invention is to provide a novel construction to minimize the cost of a hub assembly for said reel assembly.

A further object of the invention is to minimize costs of said hub assembly by providing means integrally fashioned with the hub for releasable retention of a sprocket ring with its hub, thereby eliminating a conventional metal wave washer and labor required for its assembly.

The foregoing and other objects, features and advantages of the present invention will become more apparent upon consideration of the following description and appended claims when considered in conjunction with the accompanying drawings wherein the same reference character or numeral refers to like or corresponding parts throughout the several views.

On the drawings:

FIG. 1 is a side elevational view of a take-up reel embodying the present invention, parts having been removed in the interest of drawings area economy.

FIG. 2 is an enlarged planar projection of the transverse sections indicated by the broken line 2—2 of FIG. 1 and looking in the direction of the arrows, a web coil being shown disposed about the hub of said reel.

FIG. 3 is a sectional view taken substantially on the line 3—3 of FIG. 2 and looking in the direction of the arrows.

FIG. 4 is a sectional view of a portion of said reel, said view being similar to FIG. 2, however, showing said hub disassembled from said reel.

Referring now more particularly to FIG. 1, there is seen a take-up reel generally designated 11. The reel 11 comprises a hub generally designated 13 and a pair of axially spaced apart normally outer and inner flanges 15 and 16 (FIG. 2). Said hub has opposite axially spaced apart normally outer and inner flats or sides 17 and 18 against which flat central mounting plates or bosses 19 and 20 of said flanges are secured, respectively, by means of fasteners such as rivets 21 (FIG. 2). In the present embodiment, said rivets are fashioned integrally with the hub as plugs or studs which project outwardly from sides 17 and 18. Said rivets are adapted for passage through openings in the mounting plates 19 and 20, the ends of said rivets being suited for flattening into flange-retaining heads 22 (FIG. 2). A circular rim 23 peripherally defines each of said flanges and is connected to a respective central plate 19 and 20 by means of a plurality of integral radial spokes 25. The foregoing construction defines a web chamber 28 between said flanges about said hub.

The hub has a central spindle passage 27 which extends transversely of said flanges. A plurality (six in the present embodiment) of uniformly annularly spaced keyways 31 radiate outwardly from said spindle passage. Mounting plate 19 has a central hole 29, and mounting plate 20 has a central hole 30 (FIG. 2), said central holes being disposed in co-axial alignment with and at opposite ends of said spindle passage 27. However, the diameters of the holes 29 and 30 are shown as being less than the diameter of said spindle passage so that said mounting plates partially overlay said spindle passage. Hole 29 has a plurality (three in the present embodiment) of radial uniformly annularly spaced keyway extensions 33 (FIG. 3).

The foregoing construction provides for easy registration of the hub and said flanges in operative association by alignment and partial registration of keyway extensions 33 with an equal number of said keyways 31, as illustrated in FIG. 3. Thusly arranged, said passage 27 is adapted to accommodate therein a splined drive spindle (not shown), the keyway extensions 33 being proportioned to receive in driving engagement the ends of the splines of such drive spindle.

A web 35 (FIG. 2) is coiled about said hub in the chamber 28, with the inner convolution of said web being disposed adjacent the periphery 37 of said hub. To minimize frictional engagement between the hub and the web, said hub periphery has an annular taper, sloping centrally toward the inner hub side 18. Also, because the hub and the coiled web may rotate at different speeds, flanges 15 and 16 may be slightly slanted outwardly from the center, as at 39 (FIG. 2), to minimize drag.

As illustrated in FIG. 2, the hub is relieved from the inner side 18 to provide an annular shoulder 41, which is concentric with passage 27, and an annular flat 59 which is parallel to hub side 18. A sprocket ring 43 is adapted for disposition about the annular shoulder in slippable frictional engagement with flat 59. Said sprocket ring has a plurality of radially extending teeth 45 which project slightly beyond the periphery of the hub. The teeth 45 are adapted to drivingly engage in notches 47 (FIG. 2) which are formed along one margin of the web. Thereby, a first convolution of a web about the hub 13 can be rotationally driven as said sprocket ring rotates to cause coiling about the hub of the downstream end portions of said web.

As illustrated in FIGS. 2, 3 and 4, the hub is provided with a plurality of uniformly annularly spaced radially extending windows or chambers 49. In the present embodiment, the windows extend entirely through the hub, opening through both sides 17 and 18 and the flat 59. Each window is defined by what might be referred to as a base 51 which represents a thickness of hub fabric which separates such window from the spindle passage 27.

A sprocket retainer or holder in the form of a spring finger 53 is fashioned integrally with each base 51. The arrangement and fabrication of parts is such, in the present embodiment, that each spring finger is inherently biased for disposition wholly within its window 49 medially of the sides 17 and 18, and projects in a general radial direction when not tensioned (FIG. 4). Each spring finger has an elongated normally erect inner section 55 and an outer integral angularly disposed sprocket-engageable section 57. The inner end of each inner spring finger section 55 is immediately co-joined with its base 51.

Each spring finger is adapted to be bent so that its outer section 57 will be rocked out of an associated window 49 through its opening in flat 59. The angular disposition of each outer section 57 relative to its inner section is such that upon operative conditioning to the position of FIG. 2, such outer section assumes a radial aspect, whereas its inner section becomes angularly disposed.

The length of each spring finger 53 is such that when the sprocket ring 43 is disposed against the flat 59 such finger may be neither bent out of nor returned to its window. Restated, the sprocket ring is proportioned to block an outer part of each window to limit displacement of the spring fingers. Therefore, working spring fingers are required to be moved out of respective windows before the sprocket ring is mounted against flat 59. When disposed in operative condition, the outer sections 57 of the spring fingers engage against the hub distal face of the sprocket ring to cause slippable frictional engagement of the opposite face of said sprocket ring and the hub flat 59. Spring finger tension provides the torque for holding the sprocket ring and the hub in co-rotational association.

For fabrication of the hub and its integral spring fingers, a Du Pont product commercially available under the brand "Delrin 500" has been treated according to manufacturer's directions to polymerize the hub and its co-fashioned parts.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

The embodiments of the invention in which an exclusive property or privilege is claimed are defined as follows:

1. A reel construction adapted for take-up of a web having marginal drive notches and including a rotationally drivable hub, first and second reel flanges spaced apart axially of said hub and defining thereabout a web chamber, a sprocket ring mounted concentrically with said hub and adapted for co-rotation therewith, said sprocket ring having a plurality of circumferential drive teeth projecting into said web chamber for engagement in marginal notches of a first convolution of a web coiled about said hub, the improvement comprising:
   yieldable, elongated holding means integral with said hub at one end and extending from said hub with the free end in slippable frictional engagement with said sprocket ring whereby said holding means provides a torque on said sprocket ring so that said ring is in slippable co-rotation with said hub.

2. A reel construction as defined in claim 1 in which said holding means comprise a plurality of yieldable grippers normally disposed within said hub and having portions arranged for disposition outside of said hub for retention of said sprocket ring in slippable frictional engagement with said hub.

3. A reel construction as defined in claim 2 in which said hub is fashioned with side opening chamber means, said grippers being finger-like with inner end portions annularly connected from said hub and outer end portions bendable laterally of said chamber means for sprocket retention in slipping frictional engagement with a side of said hub.

4. A reel construction as defined in claim 3 in which said sprocket ring has a portion arranged in overlapping relationship with said chamber means to block return lateral movement of said outer end portions of said grippers when in sprocket ring retention condition.

5. A reel construction as defined in claim 1 in which said hub is characterized by an outer annular relieved concentric flat adapted for slippable co-rotational engagement by said sprocket ring,
   said hub having a plurality of radial chambers,
   said chambers having side openings with portions extending through said flat and adapted to be covered by said sprocket ring,
   said releasable holding means comprising a plurality of spring fingers having inner end portions connected to said hub within said chambers and outer end portions bendable outwardly from said chambers through the portions of said side openings in said flat to releasably hold said sprocket ring in slippable co-rotational association with said hub.

References Cited
UNITED STATES PATENTS

| | | | |
|---|---|---|---|
| 1,861,891 | 6/1932 | Wittel | 242—74.2 |
| 3,298,625 | 1/1967 | Babcock | 242—74 X |
| 3,315,911 | 4/1967 | Bundschuh et al. | 242—74 |
| 3,330,496 | 7/1967 | Tatter et al. | 242—74.2 |

FRANK J. COHEN, *Primary Examiner.*

N. L. MINTZ, *Assistant Examiner.*